US012093940B1

(12) United States Patent
Owino

(10) Patent No.: US 12,093,940 B1
(45) Date of Patent: Sep. 17, 2024

(54) IMPLEMENTING SECURE VIRTUAL ELECTRONIC SIGNING DEVICES FOR USER ACCOUNTS

(71) Applicant: Amazon Technologies, Inc., Seattle, WA (US)

(72) Inventor: Paul Roy Owino, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 270 days.

(21) Appl. No.: 17/244,210

(22) Filed: Apr. 29, 2021

(51) Int. Cl.
*H04L 9/32* (2006.01)
*G06Q 20/38* (2012.01)

(52) U.S. Cl.
CPC ....... *G06Q 20/3829* (2013.01); *H04L 9/3255* (2013.01); *H04L 2209/56* (2013.01); *H04L 2209/72* (2013.01)

(58) Field of Classification Search
CPC .............. G06Q 20/3829; H04L 9/3255; H04L 2209/56; H04L 2209/72
See application file for complete search history.

(56) References Cited

U.S. PATENT DOCUMENTS

| | | | |
|---|---|---|---|
| 8,327,428 B2 * | 12/2012 | Bailey | G06F 21/31 713/168 |
| 9,178,698 B1 * | 11/2015 | Jarjur | G06F 21/53 |
| 9,547,879 B1 | 1/2017 | Rakowicz et al. | |
| 9,853,818 B2 | 12/2017 | Oswalt | |
| 10,110,385 B1 * | 10/2018 | Rush | H04L 9/3234 |
| 10,263,789 B1 * | 4/2019 | Popoveniuc | H04L 9/3268 |
| 10,324,803 B1 * | 6/2019 | Agarwal | G06F 16/113 |
| 10,509,663 B1 * | 12/2019 | Unnikrishnan | G06F 21/53 |
| 10,776,173 B1 * | 9/2020 | Greenwood | G06F 9/5011 |
| 11,086,685 B1 * | 8/2021 | Koppes | G06F 9/45558 |
| 11,537,421 B1 * | 12/2022 | Brooker | H04L 9/0894 |
| 2010/0132027 A1 * | 5/2010 | Ou | H04L 63/0227 726/11 |
| 2017/0161768 A1 * | 6/2017 | Lopez | G06Q 30/0226 |
| 2017/0185438 A1 * | 6/2017 | Thomas | G06F 9/45558 |

(Continued)

FOREIGN PATENT DOCUMENTS

| | | | |
|---|---|---|---|
| CN | 103701583 A | * | 4/2014 |
| CN | 103701583 B | * | 12/2016 |
| WO | WO-2019012322 A1 | * | 1/2019 |

*Primary Examiner* — Neha Patel
*Assistant Examiner* — Chunling Ding
(74) *Attorney, Agent, or Firm* — Robert C. Kowert; Kowert, Hood, Munyon, Rankin & Goetzel, P.C.

(57) ABSTRACT

An electronic signature service of a provider network may specify a virtual electronic signing device (ESD) to be used by user accounts (e.g., retail sales businesses) to generate digital signatures for documents (e.g., sales receipts). The electronic signature service may establish an isolated virtual network (IVN) on behalf of the client (e.g., taxing authority or other entity), which is managed by the client via a client interface. The electronic signature service may instantiate, on behalf of a user account, an ESD compute instance based on the virtual ESD specification. In response to receiving a request for a digital signature of a document, the ESD compute instance generates a digital signature based on the document and sends the digital signature to the user account. The service may store the signature and associated document data, which can subsequently be used for auditing (e.g., tax auditing).

20 Claims, 8 Drawing Sheets

(56) References Cited

U.S. PATENT DOCUMENTS

| | | | |
|---|---|---|---|
| 2018/0109799 A1* | 4/2018 | De Cock | H04N 21/234354 |
| 2018/0173561 A1* | 6/2018 | Moroski | G06F 9/4843 |
| 2018/0183607 A1* | 6/2018 | Sabin | H04L 9/3247 |
| 2019/0065406 A1* | 2/2019 | Steiner | H04L 9/3271 |
| 2019/0280875 A1* | 9/2019 | Ragnoni | G06F 21/64 |
| 2021/0027293 A1* | 1/2021 | Groarke | G06Q 20/401 |
| 2021/0036889 A1* | 2/2021 | Jain | H04L 61/2535 |
| 2022/0035882 A1* | 2/2022 | Atluri | G06F 16/9538 |

* cited by examiner

US 12,093,940 B1

IMPLEMENTING SECURE VIRTUAL ELECTRONIC SIGNING DEVICES FOR USER ACCOUNTS

BACKGROUND

The use of electronic signing devices (ESDs) is often required by governments or other entities in order to allow for certification of the authenticity of transactions through the generation of digital signatures. For example, a taxing authority may require a retailer to use an ESD in conjunction with accounting software running on the retailer's computer system. For a financial document to be valid (e.g., a sales receipt), the tax authority may require a digital signature for the financial document to be generated by the ESD and associated with the financial document (e.g., added to the end of the sales receipt). An electronic copy of each financial document may be stored by the accounting software, along with the digital signature. The taxing authority may obtain the ESD at a later time in order to certify the authenticity of transactions reported by the retailer (e.g., to verify that the correct amount of value added tax (VAT) has been reported by the retailer). It can be difficult for a taxing authority to prevent an ESD from being tampered with while it is in the custody of a retailer. An ESD may also be damaged during use or during handling. Moreover, collecting many ESDs from different businesses in order for a taxing authority to certify the authenticity of transactions can be a time-consuming, expensive, and error-prone process.

Figure 1:
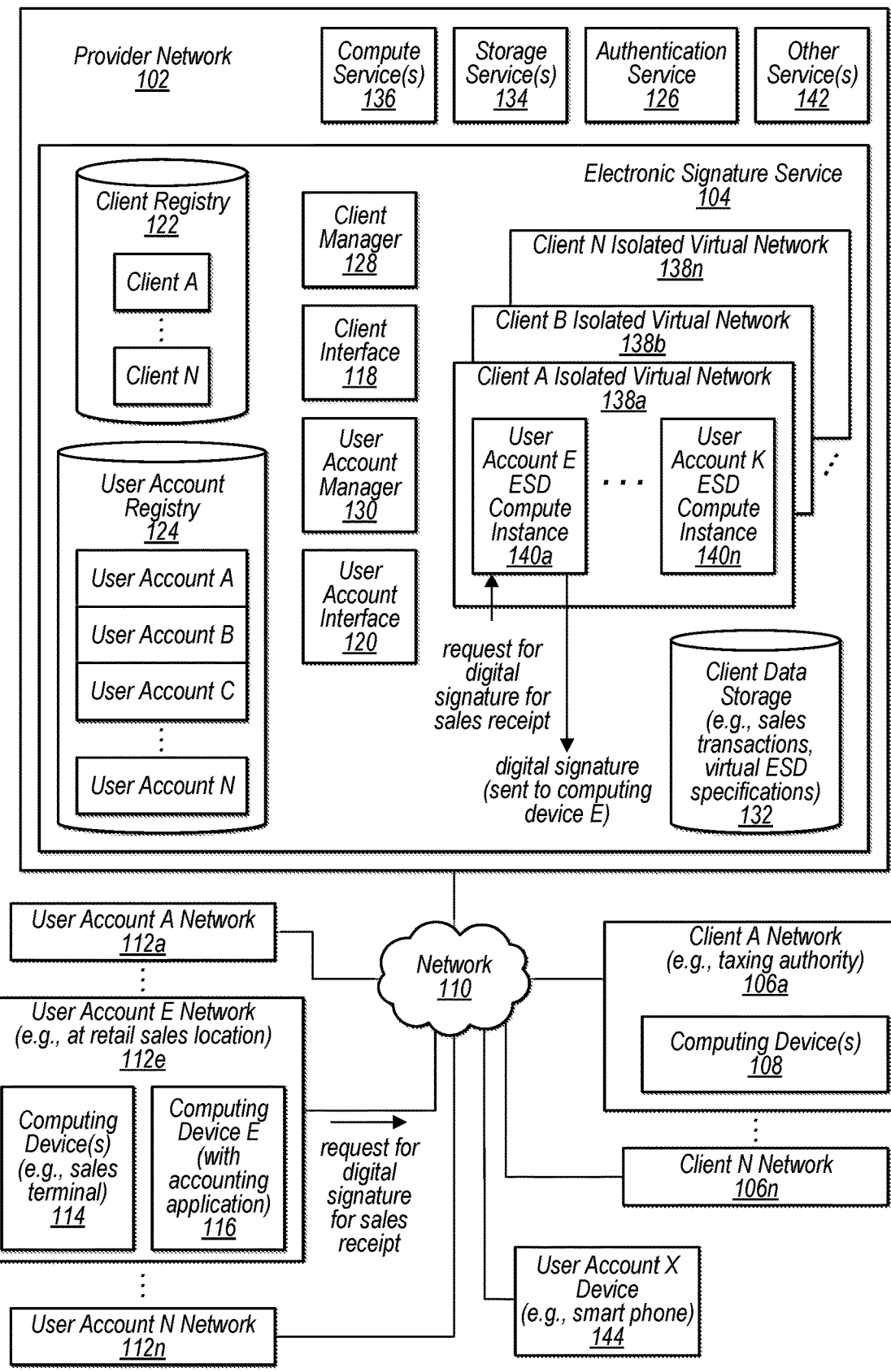
FIG. 1 is a logical block diagram illustrating a system for implementing secure virtual electronic signing devices for user accounts, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement secure virtual electronic signing devices (ESDs) for user accounts, according to some embodiments. In embodiments, a client (e.g., government, taxing authority, or other entity) of an electronic signature service may use a virtual ESD of a provider network to certify transactions (e.g., sales transactions of a retailer) instead of a physical ESD. For example, a taxing authority may register, with the electronic signature service, different user accounts for different businesses and instantiate an ESD instance for each business that can generate digital signatures (or other types of unique identifiers) for sales transactions (e.g., a digital signature for a sales receipt or other transaction document). In embodiments, the service may store the digital signatures and associated document data (e.g., amount of tax collected) that can be used for auditing by the tax authority.

By providing techniques to use "virtual" ESDs instead of physical ESDs, embodiments may reduce the amount of time and errors associated with collecting transaction data from businesses as well as increase the security of transaction data, compared to traditional techniques. In embodiments, the electronic signature service may establish an isolated virtual network (IVN) on behalf of the client (e.g., taxing authority or other entity), which is managed by the client via a client interface (e.g., using various application programming interface (API) calls). For example, the client may register any number of user accounts (e.g., for different businesses) in order to allow the user accounts to use different ESD compute instances. The client may also specify any number of configuration parameters for a virtual ESD that determine the configuration of an ESD compute instance.

In embodiments, the electronic signature service may receive, from a registered user account, an indication of a virtual ESD of a client and/or the client itself (e.g., a request to use a particular virtual ESD specified by the client). In some embodiments, a user of the account may select the virtual ESD from a list of multiple virtual ESDs available for selection and/or the user may select a client from a list of multiple clients available for selection (e.g., a list of different taxing authorities). In response, the service may instantiate, within the client's IVN, an ESD compute instance on behalf of the user account and assign to the user account permission to access the ESD compute instance. The ESD compute instance may then operate as a "virtual" ESD device by generating digital signatures (or other unique identifiers) for transactions and performing various other tasks, as described in more detail below.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of systems for implementing secure virtual electronic signing devices for user accounts. A number of different methods and techniques to implement secure virtual electronic signing devices for user accounts are described, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for implementing secure virtual electronic signing devices for user accounts, according to some embodiments.

In the depicted embodiment, a provider network 102 of a service provider includes an electronic signature service 104 that may be used by any number of clients (e.g., taxing authority or other entity), and each client may use the service 104 to generate digital signatures (or other unique identifiers) for any number of user accounts associated with the client (e.g., under the jurisdiction of the taxing authority or other entity). As shown, each client may own/manage at least one client network 106 that may include any number of computing devices 108 that may communicate within the local network 106 or with the remote provider network (or any other remote network) via a wide area network 110 (e.g., the Internet).

As depicted, each user account may own/manage at least one user account network 112 that may include any number of computing devices 114, 116 that may communicate within the local network 112 or with the remote provider network (or any other remote network) via the wide area network 110. As described below, a given user account may use resources (e.g., instances) that are configured by a particular client. Therefore, in embodiments, the user account may be considered a "client" of the particular client (as well as a client of the service 104 and/or the provider network 102).

In embodiments, any number of users/administrators or applications associated with a particular client may access the electronic signature service 104 (e.g., via the client interface 118 or other interface) by providing security credentials of the user/administrator and/or the particular client (e.g., in response to authentication based on the unique credentials of the client). Similarly, any number of users/administrators or applications associated with a particular user account may access the electronic signature service 104 (e.g., via the user account interface 120 or other interface) by providing security credentials of the user/administrator and/or the particular user account (e.g., in response to authentication based on the credentials of the user account). In various embodiments, a client or user account may access and/or modify data and perform any other actions described herein using the client interface or user account interface (e.g., via a graphical user interface, command line interface, and/or API calls).

In some embodiments, the user accounts of a client (e.g., user accounts registered by the client) are unable to access the electronic signature service 104 via the client interface 118. Therefore, the user accounts may not have permission to establish resources, configure resources, and/or perform any other tasks that may only be performed by the client via the client interface.

As shown, a client registry 122 of the service 104 may store/maintain data for any number of clients (e.g., client ID, access permissions) that are authorized to use the service 104 and a user account registry 124 may store/maintain data for any number of user accounts (e.g., user account ID, access permissions) that are authorized to use the service 104. In embodiments, some or all of the authentication/authorization of clients and/or user accounts may be performed by an authentication service 126 of the provider network (e.g., via API calls from the electronic signature service to the authentication service 126).

In the example embodiment, a client manager 128 may add/remove data in the client registry and/or perform any number of actions in response to request from clients (e.g., via the client interface). Similarly, a user account manager 130 may add/remove data in the user account registry and/or perform any number of actions in response to request from clients or user accounts (e.g., via the client interface or user account interface). In embodiments, any data associated with a client and/or user account (e.g., digital signatures, transaction data, specifications) may be stored/maintained by the service 104 in client data storage 132 and/or by another storage service 134 of the provider network.

In embodiments, a client may update or add/remove any of the data associated with the client that is stored/maintained by the service 104 (e.g., via the client interface 118). For example, client A may change one or more configuration parameters of the specification for a virtual ESD. This may result in different behavior/functionality for ESD compute instances based on that specification that are subsequently instantiated for user accounts. As another example, a client may retrieve data (e.g., monetary value of tax and/or sales) over a particular period of time (e.g., a particular fiscal period) by providing a start and end date for the period of time (e.g., to audit the transactions/taxes over the fiscal period).

As shown, the electronic signature service 104 may establish isolated virtual networks 138 (IVNs) on behalf of any number of different clients (using computing resources of the electronic signature service 104 and/or computing resources of a virtual compute service 136). In embodiments, an IVN (which may also be referred to in some environments as a "virtual private cloud") of a client may comprise a collection of compute and/or other resources in a logically isolated section of the provider network, over which the client is granted substantial control with respect to networking configuration.

In embodiments, the client may have permission to access resources of the client's IVN and permission to establish/configure resources of the client's IVN (e.g., instantiate compute instances), while other clients do not have permission to access resources of the client's IVN or to establish/configure resources of the client's IVN. In some embodiments, a client may select the IP (Internet Protocol) address ranges to be used for the IVN resources such as various compute instances, manage the creation of subnets within the IVN, and/or manage the configuration of route tables for the IVN. In embodiments, provider network may establish an IVN for a client in response to request (via the client interface) to establish the IVN (e.g., at the provider's data centers).

In some embodiments, the electronic signature service 104 may receive, from the client via the client interface 118, a specification for a virtual ESD. For example, the client may indicate any number of configuration parameters for a virtual ESD that determine the configuration of an ESD compute when instantiated (e.g., encryption key to use for generating a digital signature for a document, type of document data to be stored at the service 104 on behalf of the client). For example, a taxing authority may specify that for sales receipts, only the total sales tax charged and the date of the sales transaction is to be stored (for auditing purposes). In embodiments, any number of configuration parameters may be used to indicate any number of different types/classifications of data that are to be stored on behalf of the client. In embodiments, the service 104 or another service of the provider network may maintain one or more encryption keys on behalf of the client, and the client may specify one or more of those keys for use in generating a digital signature for documents. For example, the client may select a different encryption key to be used for each user account and/or ESD instance.

As depicted, the service 104 may receive, from user account E (e.g., from a user of a computer at the user account E network) via the user account interface 120, an indication of the virtual ESD (e.g., a selection of the virtual ESD previously specified by the client). In embodiments, if the client has specified only one type of virtual ESD to be available for use (e.g., available for use by user accounts operating under a particular tax authority, country, taxing jurisdiction), then the service may receive an indication of the client itself or an indication of the country/taxing jurisdiction (e.g., a selection of a particular tax authority/country/taxing jurisdiction from a list of different tax authorities/countries/taxingjurisdictions).

In response to receiving the indication, the electronic signature service 104 may instantiate, within the isolated virtual network (e.g., client A IVN 138a), an ESD compute instance on behalf of the user account (e.g., user account E ESD compute instance 140a). The configuration of the ESD compute instance may be based on the specification for the virtual ESD that was previously provided by client A (e.g., according to the parameters provided by client A via the client interface). In response to receiving the indication, the electronic signature service 104 may also assign, to the user account, permission to access the ESD compute instance (e.g., based on unique user credentials assigned to each of the user accounts).

In embodiments, any remaining ones of the user accounts that are associated with client A (e.g., other user accounts registered by client A as user accounts of client A, such as user account K) are unable to access user account E ESD compute instance 140a. Conversely, user account K may be assigned permission to access user account K ESD compute instance 140n, and any remaining ones of the user accounts that are associated with client A (e.g., other user accounts registered by client A as user accounts of client A, such as user account E) are unable to access user account K ESD compute instance 140n. This prevents one user account from unauthorized access to data and/or resources of another user account. However, client A may have access to any of the data and/or resources of any of the user accounts that are registered by client A (since client A is the owner/manager of those user accounts).

After the user account E ESD compute instance 140a is instantiated, it is available to be used by user account E as a virtual ESD. The user account E ESD compute instance 140a may receive, from a remote device (e.g., an accounting application executing on computing device E 116), a request for a digital signature for a document (e.g., a sales receipt generated by a sales terminal 114) The request may include/specify the document (e.g., as part of the request). In embodiments, the request may be transmitted over a secure connection to the user account E ESD compute instance 140a according to a secure communication protocol (e.g., transport layer security (TLS)) in order to prevent unauthorized access to data communicated between the user account E network 112 and the user account E ESD compute instance 140a. In embodiments, the secure connection may be established after authenticating credentials provided by a connection request from the remote device (e.g., mutual TLS authentication).

In response to receiving the request, the user account E ESD compute instance 140a may perform any number of tasks. For example, the ESD compute instance may generate a digital signature based on an encryption key and the document (e.g., a portion of data or all data of the sales receipt), send the digital signature to the remote device, cause the digital signature to be stored (e.g., at client data storage 132), and/or cause at least some of the data of the document to be stored (e.g., at client data storage 132). For example, the ESD compute instance may store a value for the amount of tax and the data indicated by the sales receipt. In embodiments, the client may access the data at a later time via the client interface (e.g., for tax auditing purposes).

Although the above example describes the generation of a digital signature for a document, in various embodiments any type of algorithm and/or unique identifier that uniquely identifies a document (e.g., receipt) with respect to other documents may be generated by the service 104 (based on contents of the document) and provided to the user account. Therefore, use of the phrase "digital signature" may be replaced with "unique identifier," in embodiments described herein. For example, the user account E ESD compute instance 140a may receive, from the accounting application executing on computing device E 116, a request for a unique identifier for a sales receipt generated by the sales terminal 114 and in response, the user account E ESD compute instance 140a may use data of the sales receipt (e.g., current date, amount of tax) and/or other data as inputs to an algorithm to generate a unique identifier that uniquely identifies the sales receipt. As with a digital signature, if the algorithm is run using the same document at a later point in time, the same unique identifier should be generated. If the same unique identifier is not generated (or the same digital signature is not generated), then the client may determine that the document is not actually the same document (e.g., contents of the document are different than the document that was originally used to generate the unique identifier or digital signature).

In various embodiments, a stand-alone device of a user account may be used with the electronic signature service 104 in the same or similar manner as described above for a user account network. For example, user account X device 144 may be a smart phone or any other type of stand-alone computing device that includes an application that sends a request to the service 104 for a digital signature for a document (e.g., for a sales receipt) and receives the digital signature from the service 104 (e.g., signature for the sales receipt). For example, a user of a mobile smartphone (e.g., a street vendor with a user account registered with the service 104) may generate a receipt using an application of the mobile phone, send a request to the service for a digital signature of the receipt, and receive/store the digital signature at the smart phone. The user account may use some or all of the service functionality discussed above (e.g., use the user account interface to cause an ESD compute instance to be instantiated on behalf of the user account). In embodiments, any number of user account stand-alone devices 144 and/or user account networks 112 may be used with the service 104.

Some implementations of the provider network 102 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands (e.g., commands from clients or user accounts). These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network.

Preferably, availability zones within a region are positioned far enough away from one other that the same natural disaster should not take more than one availability zone offline at the same time. Customers (e.g., clients or user accounts) can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include the electronic signature service 104, a virtual compute service (e.g., one of the compute services 136), data processing service(s) (e.g., map reduce, data flow, and/or other large scale data processing techniques), data storage services 134 (e.g., object storage services, block-based storage services, or data warehouse storage services) and/or any other type of network based services 142 (which may include various other types of storage, processing, analysis, communication, event handling, visualization, and security services not illustrated). The resources required to support the operations of such services (e.g., compute and storage resources) may be provisioned in an account associated with the cloud provider (e.g., an account for a particular client of the electronic signature service 104), in contrast to resources requested by users of the cloud provider network, which may be provisioned in user accounts (e.g., ESD compute instances provisioned for user accounts associated with a particular client of the electronic signature service 104, such as a particular taxing authority).

Computing services (e.g., the electronic signature service 104, compute service(s) 136, storage service(s) 134, authentication service 126, and/or other services 142) may implement various computing resources at one or more data centers. The computing services can include an elastic compute cloud service (referred to in various implementations as an elastic compute service, a virtual machines service, a computing cloud service, a compute engine, or a cloud compute service). This service (which may be used by the electronic signature service 104 or which may be provided as part of the electronic signature service 104) may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families.

An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer (e.g., a user account or a client) may choose an instance type from a predefined set of instance types (e.g., different types of ESD compute instances defined by different specifications for virtual ESDs). As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine. A container engine can run on a virtual machine instance in some implementations, with the virtual machine instance selected based at least partly on the described network performance metrics.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 2A:
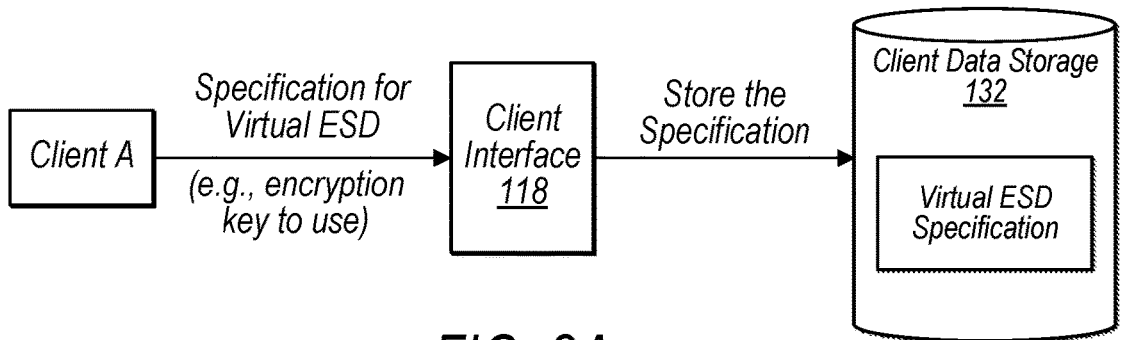
FIG. 2A is a logical block diagram illustrating a client using a client interface to store a specification for a virtual ESD, according to some embodiments.

FIG. 2A is a logical block diagram illustrating a client using a client interface to store a specification for a virtual ESD, according to some embodiments.

In the depicted embodiment, client A (e.g., a user of a computing device 108 at the client A network 106a) sends a specification for a virtual ESD to the electronic signature service 104 via the client interface 118. For example, the user may provide input to a GUI or command line interface of the computing device 108 to provide one or more configuration parameters for the virtual ESD (e.g., a particular encryption key to use when generating a digital signature). The client interface may store the specification (each configuration parameters) on behalf of the client at the client data storage 132 as a virtual ESD specification for the virtual ESD. In embodiments, the client data storage 132 may store any number of different virtual ESD specifications for the client and/or for any number of other clients.

Figure 2B:
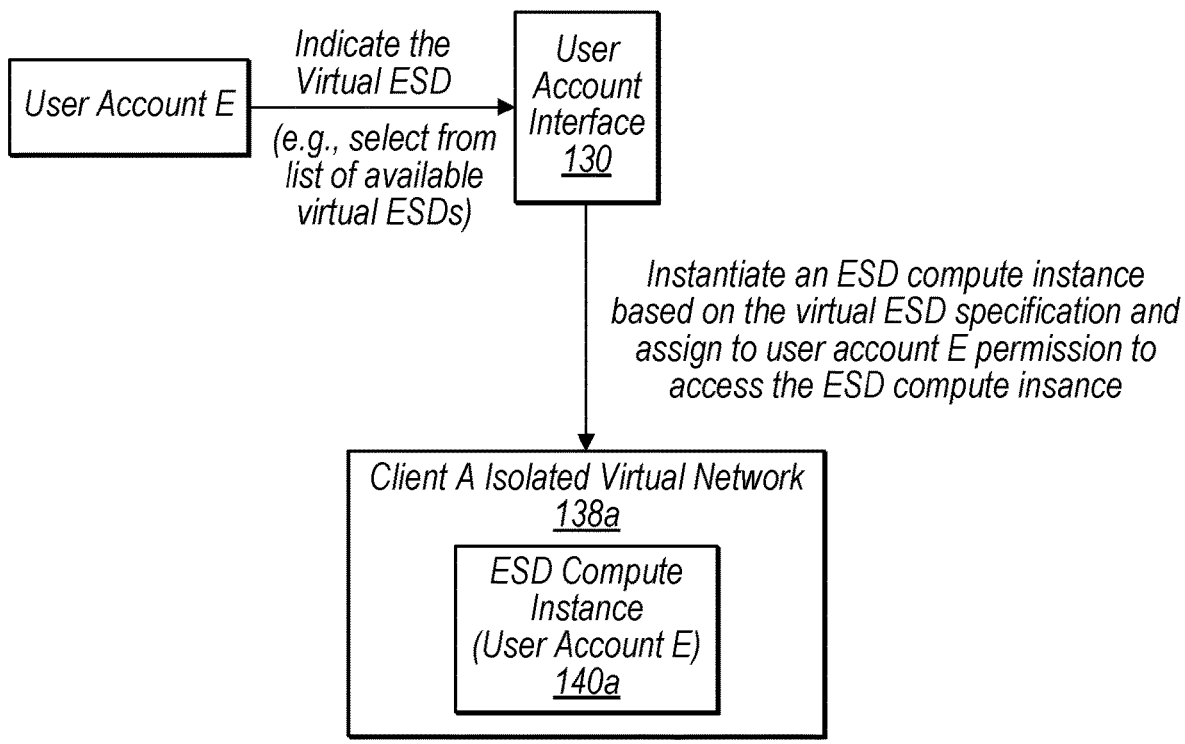
FIG. 2B is a logical block diagram illustrating a user account using a user account interface to indicate a virtual ESD to be used for instantiating a ESD compute instance on behalf of the user account, according to some embodiments.

FIG. 2B is a logical block diagram illustrating a user account using a user account interface to indicate a virtual ESD to be used for instantiating a ESD compute instance on behalf of the user account, according to some embodiments.

As shown, user account E (e.g., a user of a computing device 114 at the user account E network 112e) sends an indication of a particular virtual ESD (the virtual ESD of FIG. 2A that was specified by client A) to the electronic signature service 104 via the user account interface 130. For example, the user may provide input to a GUI or command line interface of the computing device 114 to indicate the particular virtual ESD (e.g., selection of the particular virtual ESD from a list of available virtual ESDs). In response, the electronic signature service 104 may instantiate an ESD compute instance (user account E ESD compute instance 140a) within client A IVN 138a based on the virtual ESD specification for the particular virtual ESD. The electronic signature service 104 may also assign to user account E permission to access the instantiated ESD compute instance (e.g., allowing user account E to subsequently use the compute instance to generate digital signatures).

Figure 3:
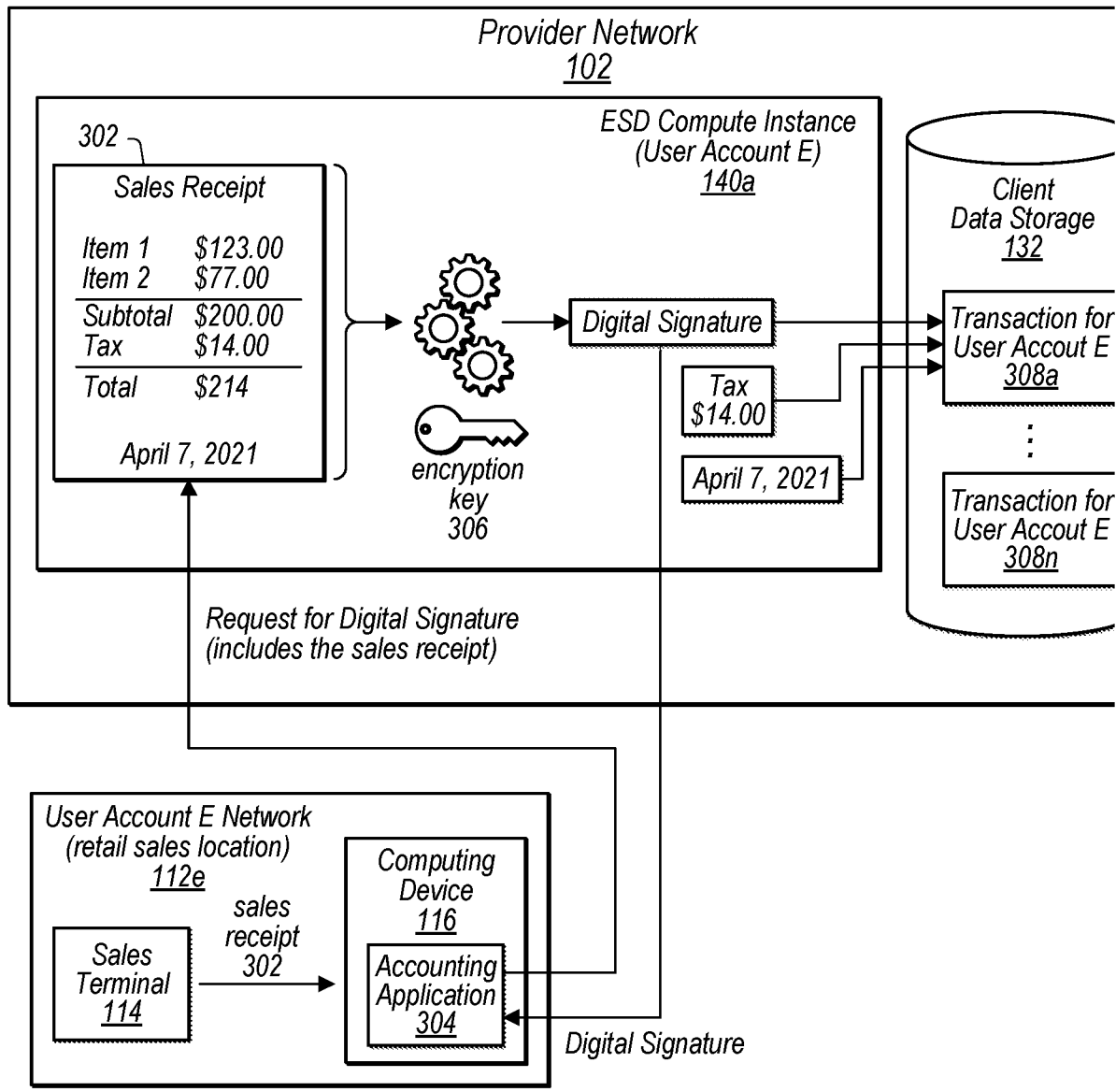
FIG. 3 is a logical block diagram illustrating an ESD compute instance generating a digital signature in response to a request from a user account, according to some embodiments.

FIG. 3 is a logical block diagram illustrating an ESD compute instance generating a digital signature in response to a request from a user account, according to some embodiments.

In the depicted embodiment, a sales terminal 114 (e.g., one of the computing devices user account E network 112e) generates a sales receipt 302 for a completed sales transaction. The sales receipt may be sent to an accounting application 304 executing on a computing device 116 of the user account E network 112e. The accounting application may send, to the ESD compute instance 140a, a request for a digital signature for the sales receipt (e.g., via a TLS connection). Although the depicted example involves a sales receipt for a sales transaction, in various embodiments any other type of document may be used instead (depending on the type of transaction performed).

In response to receiving the request, the ESD compute instance 140a may perform any number of tasks, including generating a digital signature for the sales receipt based on an encryption key 306. In embodiments, the ESD compute instance 140a may perform any number of other tasks before and/or after the generation of the digital signature. For example, before generation of the digital signature, the ESD compute instance 140a may determine whether the data of the sales receipt complies with one or more criteria or rules indicated by the specification for the virtual ESD that was used to instantiate the ESD compute instance 140a (e.g., the amount of tax on the sales receipt ($14) is to be a particular percentage of the subtotal (e.g., 7%)). If so, then the instance may generate the digital signature. If not, then the instance may send message to the accounting application 304 that indicates the sales receipt is invalid (without generating a digital signature).

As shown, the ESD compute instance 140a may send the digital signature to the accounting application 304. In embodiments, the ESD compute instance 140a may also cause the digital signature and at least a portion of the data of the sales receipt to be stored at the provider network and/or another storage location of the client (e.g., at the client A network 106a). For example, the digital signature, the tax (e.g., $14.00), and the date (e.g., Apr. 7, 2021) may be stored at the data storage 132 as part of a transaction and associated with a unique transaction ID. Any number of transactions for user account E and/or other user accounts may be stored for client E (and other clients) at the provider network, each with a unique transaction ID. In embodiments, this may provide a convenient way for a tax authority (or other entity) to audit/verify the transactions (e.g., over a particular period of time/fiscal period).

In some embodiments, all of the document data may be used to generate the digital signature (e.g., all of the values of the fields of the document or all of the characters/data of the document/file). For example, a digital signature (e.g., a hash value) may be calculated based on the encryption key 306 and all of the data of the sales receipt. In some embodiments, only a portion of the document data may be used to generate the digital signature (e.g., any number of values of certain fields less than the total number of values of the document). For example, a digital signature may be calculated based on the encryption key 306, the value of the tax field (e.g., $14.00), and the value of the date field (e.g., Apr. 7, 2021).

Figure 4:
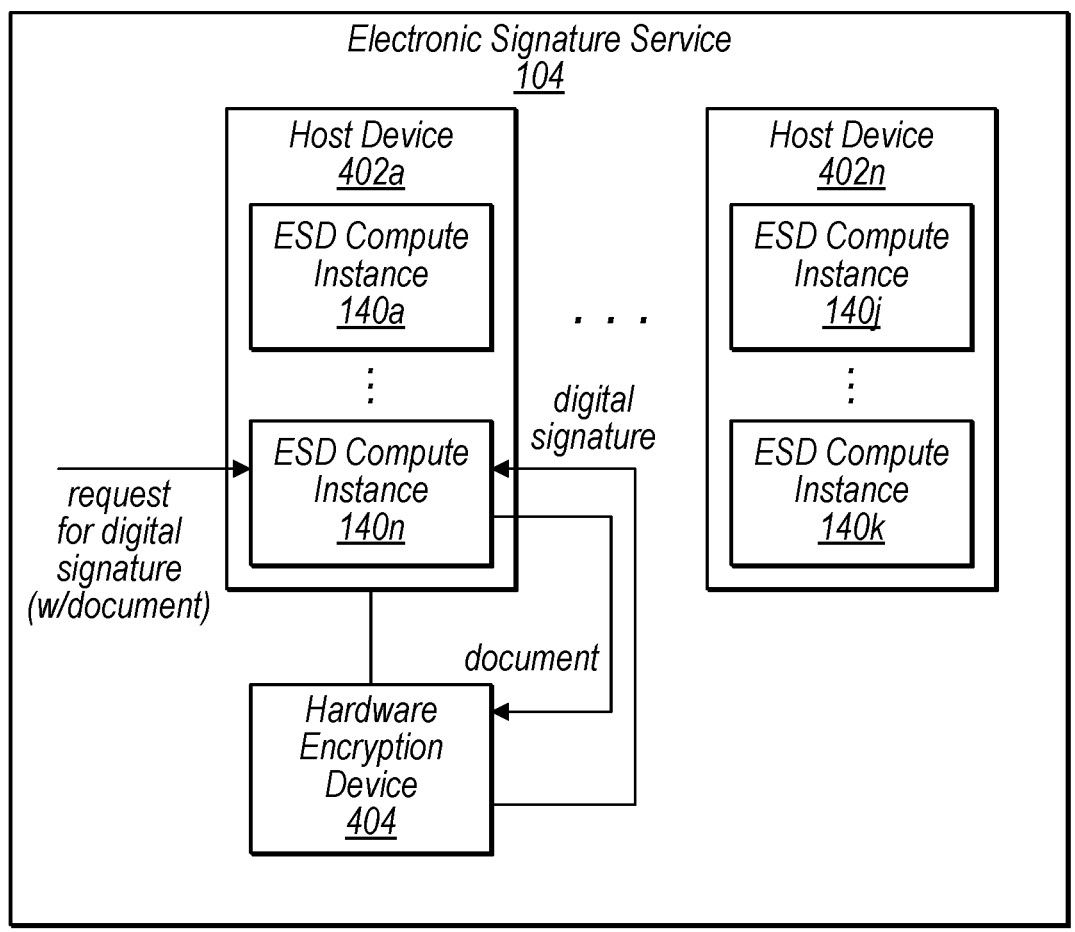
FIG. 4 is a logical block diagram illustrating an ESD compute instance that uses an encryption device to generate a digital signature for a document, according to some embodiments.

FIG. 4 is a logical block diagram illustrating an ESD compute instance that uses an encryption device to generate a digital signature for a document, according to some embodiments.

In embodiments, a client may indicate, as part of a virtual ESD specification, that the virtual ESD is to use a hardware encryption device (e.g., a particular type or model of hardware encryption device) in order to generate digital signatures. In the depicted embodiment, any number of host devices 402 may each host any number of ESD compute instances 140 for any number of clients and/or user accounts.

As shown, a hardware encryption device 404 is attached to the host device 402a. In embodiments, the hardware encryption device 404 may be physically installed onto the host device (e.g., attached/installed as a component of a host server) or may communicate with the host device 402a over a local network connection within the provider network. In the example embodiment, the ESD compute instance 140n is configured based on a virtual ESD specification that indicated the instance is to use a type or model of hardware encryption device that matches the hardware encryption device 404. In response to a request from a user account for the virtual ESD, the service 104 may identify the host device 402a as including a hardware encryption device that matches the indicated type or model and in instantiates the ESD compute instance 140n on the identified host device 402a.

In response to a request from the user account for a digital signature for a document, the ESD compute instance 140n sends the document (or at least a portion of the document data) to the hardware encryption device 404, which generates the digital signature based on the document (or portion of document data) and an encryption key and then sends the generated digital signature to the ESD compute instance 140n. This may allow a client to leverage the encryption capability of a particular type of hardware encryption device that may provide a higher level of data security than encryption capability of the ESD compute instance, while keeping the encryption within the secure/private IVN of the client.

Figure 5:
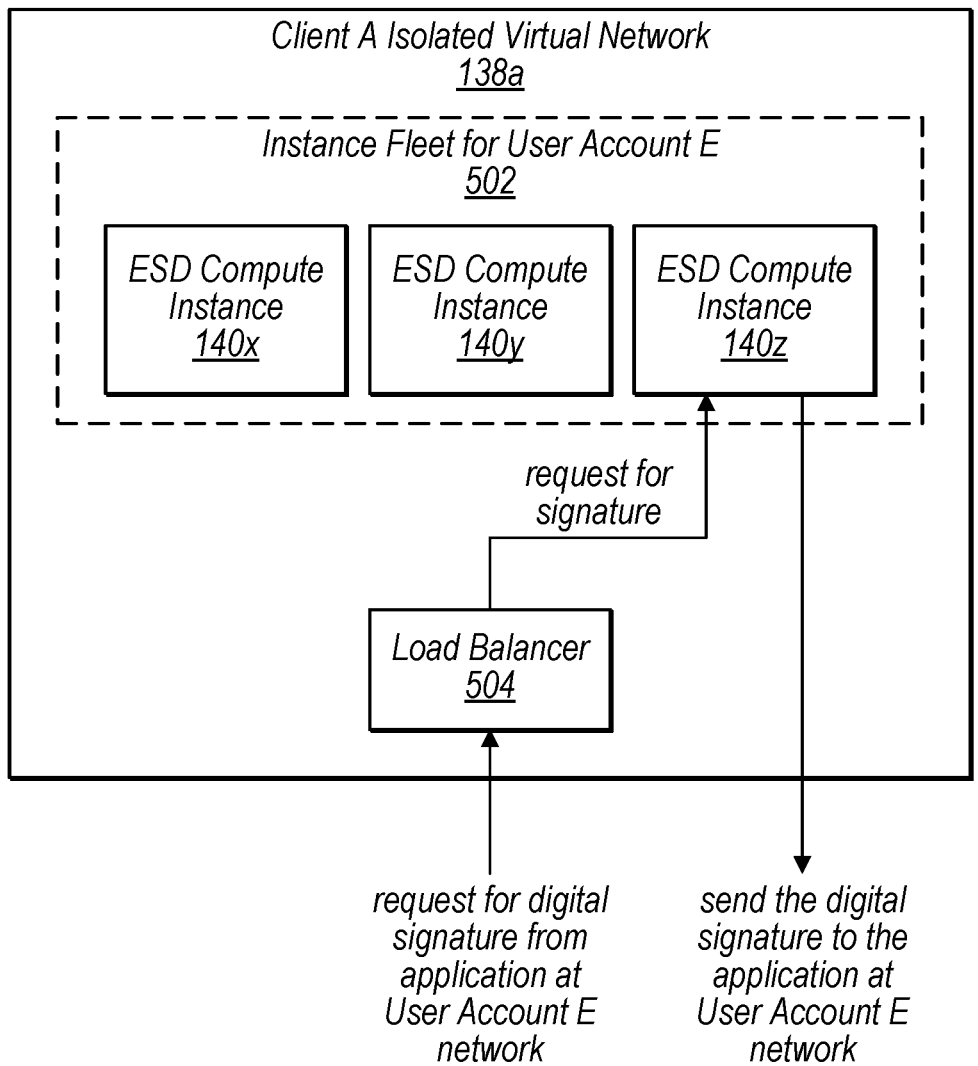
FIG. 5 is a logical block diagram illustrating a load balancer that routes a digital signature request to a particular ESD compute instance of an instance fleet for a user account, according to some embodiments.

FIG. 5 is a logical block diagram illustrating a load balancer that routes a digital signature request to a particular ESD compute instance of an instance fleet for a user account, according to some embodiments.

In some embodiments, the electronic signature service 104 may instantiate one or more additional ESD compute instances on behalf of a user account. The electronic signature service 104 may determine that a workload of a particular ESD compute instance of a user account exceeds a predefined threshold amount (e.g., a number of requests received by the particular ESD compute instance 140a from the user account during a predefined period of time (10 seconds, 30 seconds, etc.) exceeds a predefined threshold number (e.g., 100)). In response, the electronic signature service 104 may instantiate one or more additional ESD compute instances 140 on behalf of a user account to form an instance fleet for the user account (e.g., instance fleet 502 for user account E) and a load balancer 504. The predefined threshold amount, predefined period of time, and/or the predefined threshold number may be indicated as a configuration parameter of the corresponding virtual ESD specification.

As depicted, when the load balancer 504 receives a request from user account E for signature of a document, the load balancer 504 selects a particular instance (ESD compute instance 140z) and routes the request to that instance. The load balancer may select an instance that results in distributing the request processing load across the instances in a more even manner. The load balancer may select, based on one or more criteria, a particular instance. For example, the load balancer may select the instance that has processed the least number of requests over a most recent time period (e.g., the last 10 seconds). The use of a fleet of instances may improve the request handling capabilities for user accounts that generate a very large number of digital signature requests (e.g., large retailers that process many transactions per second).

Figure 6:
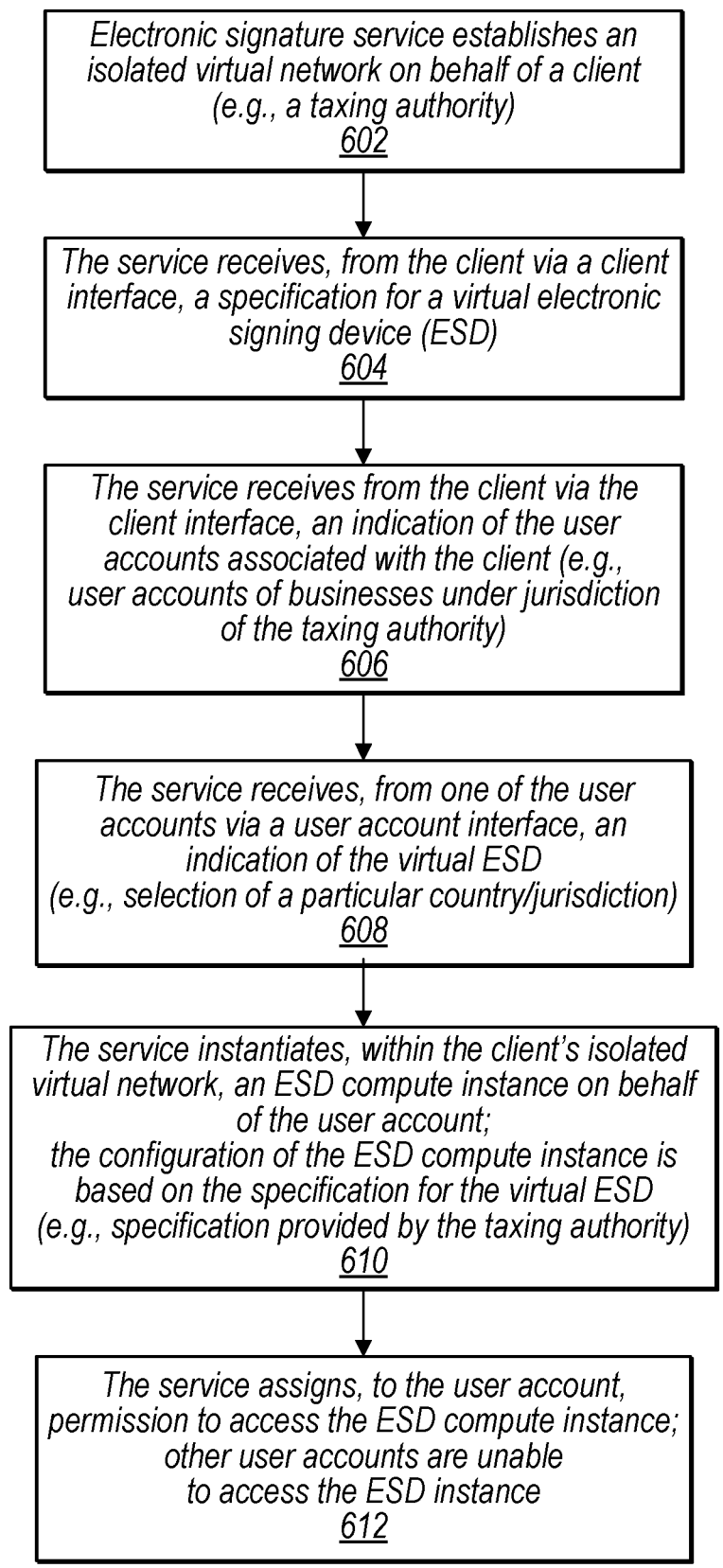
FIG. 6 is a high-level flowchart illustrating various methods and techniques to configure an electronic signature service for a user account, according to some embodiments.

FIG. 6 is a high-level flowchart illustrating various methods and techniques to configure an electronic signature service for a user account, according to some embodiments. These techniques, as well as the techniques discussed with regard to FIG. 8, may be implemented using components or systems as described above with regard to FIGS. 1-5, as well as other types of components or systems, and thus the following discussion is not intended to be limiting as to the other types of systems that may implement the described techniques.

As indicated at block 602, an electronic signature service 104 establishes an IVN on behalf of a client (e.g., a taxing authority). At block 604, the electronic signature service 104 receives, from the client via a client interface, a specification for a virtual ESD (e.g., one or more configuration parameters for configuration of an ESD compute instance). At block 606, the electronic signature service 104 receives, from the client via the client interface, an indication of different user accounts associated with the client (e.g., user accounts registered with the taxing authority). The electronic signature service 104 may register the user accounts.

At block 608 the electronic signature service 104 receives, from one of the user accounts via a user account interface, an indication of the virtual ESD. In embodiments, the indication of the virtual ESD may be made via the user account interface by selection of a country and/or other taxing jurisdiction from among multiple countries and/or other taxing jurisdictions that are available for selection (e.g., displayed as a list to a user). In response to the selection of the country and/or other taxing jurisdiction, the service 104 may instantiate an ESD compute instance on behalf of the user account based on the specification for the virtual ESD that corresponds to the country and/or other taxing jurisdiction (defined by the client/taxing authority that manages/collects taxes for the country/jurisdiction).

In embodiments, one client may define any number of different specifications for different virtual ESDs. For example, a taxing authority may define a different virtual ESD specifications (configuration parameters) for three different countries/taxing jurisdictions because they each follow different rules regarding taxes/tax compliance. For example, the countries may respectively charge a retail sales tax of 5%, 7%, and 8%.

At block 610, the electronic signature service 104 instantiates, within the client's IVN, an ESD compute instance on behalf of the user account (e.g., after authenticating and/or authorizing the request based on credentials of the user account). At block 612, the electronic signature service 104 assigns, to the user account, permission to access the ESD compute instance (e.g., based on the credentials of the user account). Other use accounts are unable to access the ESD compute instance.

Figure 7:
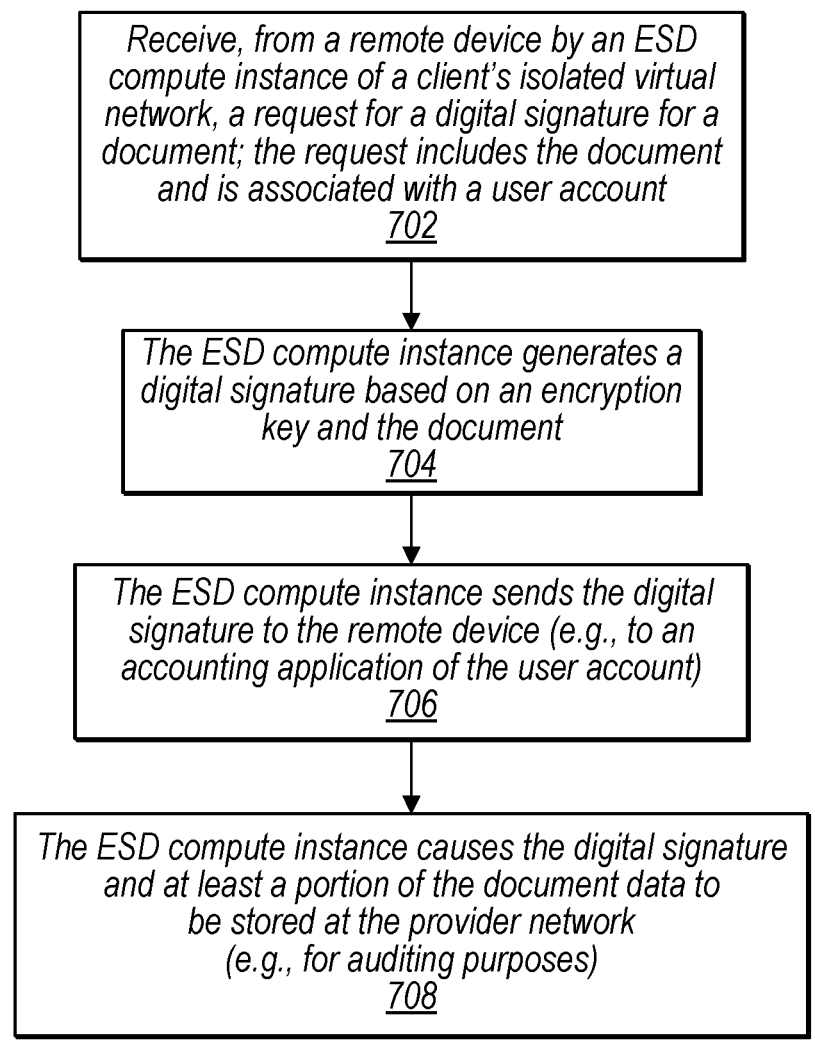
FIG. 7 is a high-level flowchart illustrating various methods and techniques to implement a secure virtual electronic signing device for a user account, according to some embodiments.

FIG. 7 is a high-level flowchart illustrating various methods and techniques to implement a secure virtual electronic signing device for a user account, according to some embodiments.

At block 702, an ESD compute instance of a client's IVN receives, from a remote device of a user account, a request for a digital signature of a document. The request may include the document and the request is associated with the user account (e.g., the request includes credentials for the user account and/or originates from a device/application of a remote network managed by the user account).

At block 704, the ESD compute instance generates a digital signature based on an encryption key and the document. At block 706, the ESD compute instance sends the digital signature to the remote device (e.g., to an accounting application of the user account). At block 708 the ESD compute instance causes the digital signature and tat least a portion of the document data to be stored at the provider network (e.g., for auditing/verification purposes).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the electronic signature service, other services, devices, and other components that implement the techniques described herein). The various methods as illustrated in the figures and described herein represent example embodiments of methods. The order of any method may be changed, and various elements may be added, reordered, combined, omitted, modified, etc.

Figure 8:
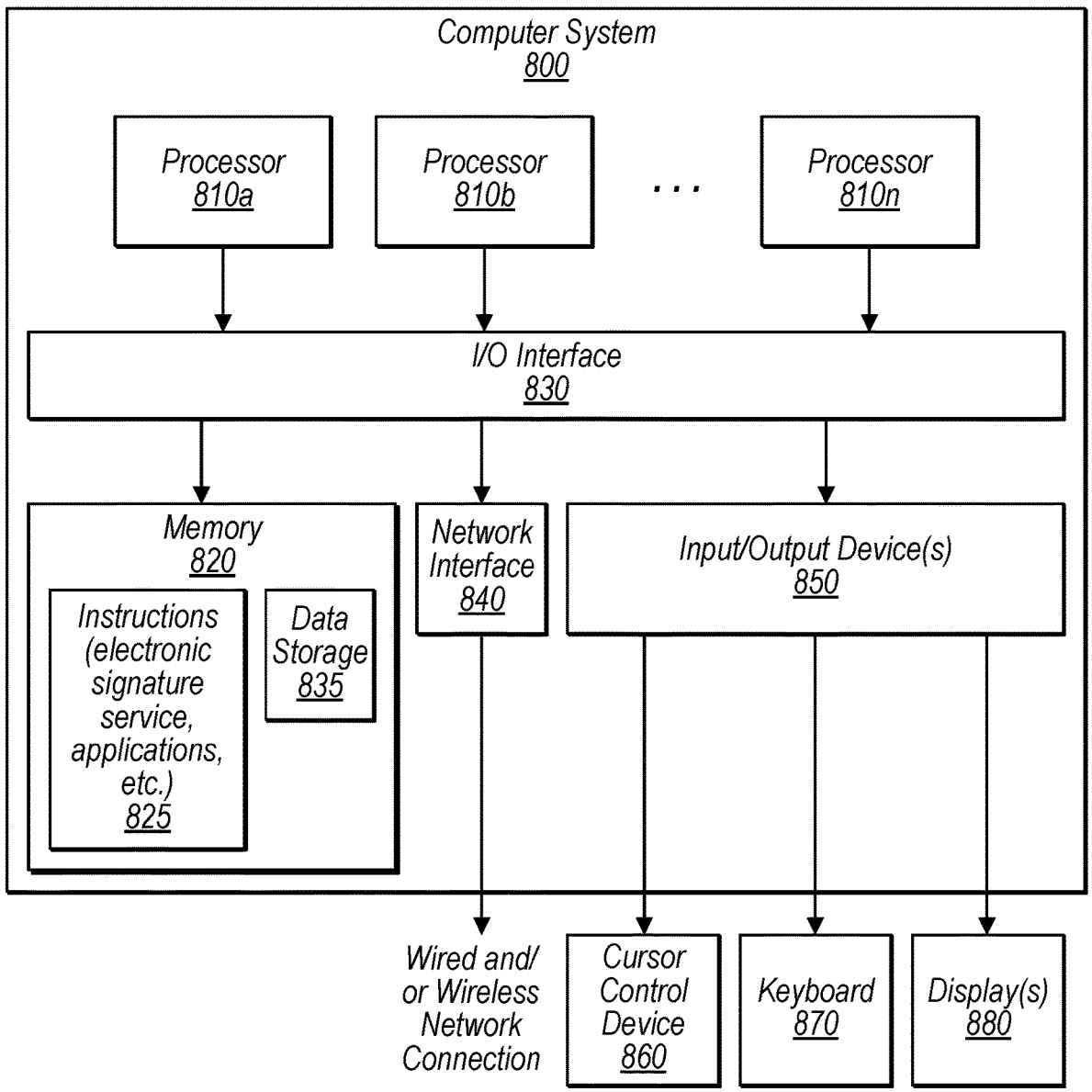
FIG. 8 is a block diagram illustrating an example computing system, according to some embodiments.

Embodiments to implement secure virtual electronic signing devices for user accounts as described herein may be executed on one or more computer systems, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the electronic signature service, other services, devices, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., requests for digital signatures, document data, transactions, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement an electronic signature service of a provider network for a plurality of clients, wherein the electronic signature service is configured to, for a given client:
  establish an isolated virtual network on behalf of the client;
  receive, from the client via a client interface, a specification for a virtual electronic signing device (ESD);
  receive, from a user account of a plurality of user accounts via a user account interface, an indication of the virtual ESD or the client, wherein the plurality of user accounts are associated with the client of the electronic signature service;
  in response to the indication:
    instantiate, within the isolated virtual network, an ESD compute instance on behalf of the user account, wherein a configuration of the ESD compute instance is based on the specification for the virtual ESD; and
    assign, to the user account, permission to access the ESD compute instance instantiated within the isolated virtual network of the client on behalf of the user account, wherein remaining ones of the user accounts are unable to access the ESD compute instance, and wherein the remaining ones of the user accounts are assigned permission to access other ESD compute instances instantiated within the same isolated virtual network of the client on behalf of the remaining ones of the user accounts that are respectively associated with the same client of the electronic signature service, and
    wherein the ESD compute instance is available to receive and process different requests for digital signatures for different documents associated with the user account subsequent to the instantiation and assignment of the ESD compute instance to the user account and prior to reception, by the ESD compute instance, of the different requests for the digital signatures for the different documents associated with the user account;
  receive, from a remote device by the ESD compute instance, a request for a digital signature for a document, wherein the request comprises the document and is associated with the user account; and
  in response to the request for the digital signature for the document, perform, by the ESD compute instance that was instantiated on behalf of the user account within the isolated virtual network of the client of the electronic signature service prior to reception, from the remote device by the ESD compute instance, of the request for the digital signature for the document:
    generate the digital signature based on an encryption key and the document;
    send the digital signature to the remote device;
    cause the digital signature to be stored at the provider network; and
    cause at least a portion of data of the document to be stored at the provider network.

2. The system as recited in claim 1, wherein the portion of the data of the document indicates a monetary value associated with one or more financial transactions, and wherein to cause at least the portion of data of the document to be stored, the ESD compute instance is configured to:
  identify the monetary value associated with the one or more financial transactions; and
  cause the monetary value to be stored at a location of the provider network.

3. The system as recited in claim 1, wherein to receive the specification for the virtual ESD, the electronic signature service is configured to:
  receive an indication of a type of data of documents to be stored, and wherein to cause the portion of data of the document to be stored, the ESD compute instance is configured to identify the portion of data as the type of data.

4. The system as recited in claim 1, wherein to receive the specification for the virtual ESD, the electronic signature service is configured to:
  receive an indication of one or more encryption keys to be used to generate digital signatures, wherein the one or more encryption keys comprise the encryption key.

5. The system as recited in claim 1, wherein the electronic signature service is configured to:
  receive, from another of the user accounts via the user account interface, another indication of the virtual ESD;
  in response to the other indication of the virtual ESD:
    instantiate, within the isolated virtual network, another ESD compute instance on behalf of the other user account, wherein a configuration of the other ESD compute instance is based on the specification for the virtual ESD; and
    grant to the other user account permission to access the other ESD compute instance;
  receive, from another remote device by the other ESD compute instance, another request for another digital signature for another document, wherein the request comprises the other document and is associated with the other user account; and
  in response to the other request, perform, by the other ESD compute instance:
    generate the other digital signature for the other document based on the encryption key or another encryption key and the other document;
    send the other digital signature to the other device;
    cause the other digital signature to be stored; and
    cause at least a portion of data of the other document to be stored.

6. A method, comprising:
  performing, by one or more computing devices of a provider network that implement an electronic signature service:
    instantiating, within an isolated virtual network of a client of the electronic signature service, an electronic signing device (ESD) compute instance on behalf of one of a plurality of user accounts associated with the client, wherein a configuration of the ESD compute instance is based on a specification for a virtual ESD provided by the client;
    assigning, to the user account, permission to access the ESD compute instance instantiated within the isolated virtual network of the client on behalf of the user account, wherein remaining ones of the user accounts are unable to access the ESD compute instance, and wherein the remaining ones of the user accounts are assigned permission to access other ESD compute instances instantiated within the same isolated virtual network of the client on behalf of the remaining ones of the user accounts that are respectively associated with the same client of the electronic signature service, and
    wherein the ESD compute instance is available to receive and process different requests for digital signatures for different documents associated with the user account subsequent to the instantiation and assignment of the ESD compute instance to the user account and prior to reception, by the ESD compute instance, of the different requests for the digital signatures for the different documents associated with the user account;

receiving, by the ESD compute instance, a request for a unique identifier for a document, wherein the request comprises the document and is associated with the user account; and in response to the request for the unique identifier, performing, by the ESD compute instance that was instantiated on behalf of the user account within the isolated virtual network of the client prior to reception, by the ESD compute instance, of the request for the unique identifier:

generating the unique identifier based on the document;

sending the unique identifier to an endpoint associated with the user account;

causing the unique identifier to be stored at the provider network; and causing at least a portion of data of the document to be stored at the provider network.

7. The method as recited in claim 6, wherein the portion of the data of the document indicates a monetary value associated with one or more financial transactions, and wherein causing at least the portion of data of the document to be stored at the provider network comprises:

identifying the monetary value associated with the one or more financial transactions; and causing the monetary value to be stored at the provider network.

8. The method as recited in claim 6, further comprising: receiving, from the client via a client interface, the specification for the virtual ESD, wherein the plurality of user accounts are unable to access the client interface.

9. The method as recited in claim 8, wherein receiving the specification for the virtual ESD comprises:

receiving, from the client via the client interface, an indication of a type of data of documents to be stored, and wherein causing the portion of data of the document to be stored comprises identifying the portion of data as the type of data.

10. The method as recited in claim 8, wherein receiving the specification for the virtual ESD comprises receiving an indication of a type of encryption hardware to be used for the generating of the unique identifier.

11. The method as recited in claim 6, wherein receiving, by the ESD compute instance, the request for the unique identifier for the document comprises:

establishing a transport layer security (TLS) connection between the ESD compute instance and a remote device associated with the user account; and receiving the document via the TLS connection.

12. The method as recited in claim 6, further comprising: instantiating one or more additional ESD compute instances on behalf of the user account;

receiving, at a load balancer, an additional request for a unique identifier for an additional document; and selecting, by the load balancer, one of the additional ESD compute instances; and sending, by the load balancer, the additional request to the selected ESD compute instance.

13. The method as recited in claim 6, further comprising: receiving, from the client via a client interface, an indication of the plurality of user accounts associated with the client.

14. The method as recited in claim 6, further comprising: receiving, by another ESD compute instance within an isolated virtual network of another client of the electronic signature service, another request for a unique identifier for another document, wherein the other request comprises the other document and is associated with another user account; and in response to the request, performing, by the other ESD compute instance:

generating another unique identifier based on the other document;

sending the other unique identifier to another endpoint;

causing the other unique identifier to be stored at the provider network; and causing at least a portion of data of the other document to be stored at the provider network.

15. One or more non-transitory computer-accessible storage media storing program instructions that when executed on or across one or more processors of a host device of a provider network cause the one or more processors to:

instantiate, within an isolated virtual network of a client of the provider network, an electronic signing device (ESD) compute instance on behalf of one of a plurality of user accounts associated with the client, wherein a configuration of the ESD compute instance is based on a specification for a virtual ESD provided by the client, and wherein the ESD compute instance is available to receive and process one or more different requests for digital signatures for different documents associated with the user account subsequent to the instantiation of the ESD compute instance to the user account and prior to reception, by the ESD compute instance, of the different requests for the digital signatures for the different documents associated with the user account;

receive, by the ESD compute instance, a request for a unique identifier for a document, wherein the request comprises the document and is associated with the user account, and wherein the user account has permission to access the ESD compute instance, and wherein remaining ones of the user accounts are unable to access the ESD compute instance, and wherein the remaining ones of the user accounts are assigned permission to access other ESD compute instances instantiated within the same isolated virtual network of the client on behalf of the remaining ones of the user accounts that are respectively associated with the same client of an electronic signature service; and in response to the request for the unique identifier, perform, by the ESD compute instance that was instantiated on behalf of the user account within the isolated virtual network of the client prior to reception, by the ESD compute instance, of the request for the unique identifier:

generate the unique identifier based on the document;

send the unique identifier to an endpoint associated with the user account;

cause the unique identifier to be stored at the provider network; and cause at least a portion of data of the document to be stored at the provider network.

16. The one or more storage media as recited in claim 15, wherein the portion of the data of the document indicates a monetary value associated with one or more financial transactions, and wherein to cause at least a portion of data of the document to be stored at the provider network, the instructions when executed on or across the one or more processors cause the one or more processors to:
- identify the monetary value associated with the one or more financial transactions; and
- cause the monetary value to be stored at the provider network.

17. The one or more storage media as recited in claim 16, wherein the specification for the virtual ESD indicates a type of data of documents to be stored, and wherein to cause at least a portion of data of the document to be stored at the provider network, the instructions when executed on or across the one or more processors cause the one or more processors to:
- identify the portion of data as the type of data.

18. The one or more storage media as recited in claim 16, wherein the specification for the virtual ESD indicates a type of encryption hardware to be used for the generating of the unique identifier, and wherein to generate the unique identifier based on the document, the instructions when executed on or across the one or more processors cause the one or more processors to:
- send the document to a hardware device connected to the host device, wherein the hardware device comprises the type of encryption hardware; and
- receive, from the hardware device, the unique identifier.

19. The one or more storage media as recited in claim 15, wherein the instructions when executed on or across the one or more processors cause the one or more processors to:
- instantiate, within the isolated virtual network of the client, another electronic signing device (ESD) compute instance on behalf of another of the plurality of user accounts associated with the client, wherein a configuration of the other ESD compute instance is based on a different specification for a different virtual ESD provided by the client.

20. The one or more storage media as recited in claim 19, wherein the instructions when executed on or across the one or more processors cause the one or more processors to:
- receive, by the other ESD compute instance, another request for a unique identifier for another document, wherein the request other comprises the other document and is associated with the other user account, and wherein the other user account has permission to access the other ESD compute instance, and wherein remaining ones of the user accounts are unable to access the other ESD compute instance; and
- in response to the request, perform, by the other ESD compute instance:
  - generate another unique identifier based on the other document;
  - send the other unique identifier to another endpoint associated with the other user account;
  - cause the other unique identifier to be stored at the provider network; and
  - cause at least a portion of data of the other document to be stored at the provider network.

\* \* \* \* \*